April 29, 1969  H. C. LAW  3,441,222
GARDEN HOSE NOZZLE POSITIONER
Filed April 25, 1967  Sheet 2 of 2

Harold C. Law

United States Patent Office 3,441,222
Patented Apr. 29, 1969

3,441,222
GARDEN HOSE NOZZLE POSITIONER
Harold C. Law, 6025 N. Arlington Blvd.,
San Pablo, Calif. 94806
Filed Apr. 25, 1967, Ser. No. 634,068
Int. Cl. B05b 15/08
U.S. Cl. 239—280.5      2 Claims

ABSTRACT OF THE DISCLOSURE

A portable manually operated apparatus utilizing the principle of a ball-joint and friction to fix the position of a garden hose nozzle so to allow the flow of a stream or spray of water from the nozzle in a predetermined direction. A sphere supported by the base of the apparatus provides universal adjustability and also mass to overcome the reaction of the jet of water emanating from the nozzle, thereby enabling the nozzle to be situated high above ground for water to attain greater range and ground coverage.

Introduction

This invention relates to garden hose nozzle positioners used to direct the flow of water from the nozzle directly to the ground or into the air before striking the ground. The distance at which the water will cover is determined by the inclination of the nozzle and the intensity of the water pressure.

Statement of the problem

Manual control of an ordinary hose and nozzle to thoroughly soak specific plants and/or areas can consume much of the time of the person doing the chore, expose him to the elements of heat and sun, cold and wind, and, if the wind is blowing the wrong way, get him wet.

Object of the invention

The object of the invention, the hose nozzle positioner, is (1) to get the water to go in the direction and to the distance selected, and (2) to maintain a constant flow of water in the same direction until further adjustment is made. The use of the invention eliminates the need of the person to hold the nozzle while the watering is being done.

General description of each figure

In the drawing which forms part of the present specification, FIGURE 1 is a top plan view of the nozzle positioner with a portion of the metallic tubing cut away.

Figures 1, 2:
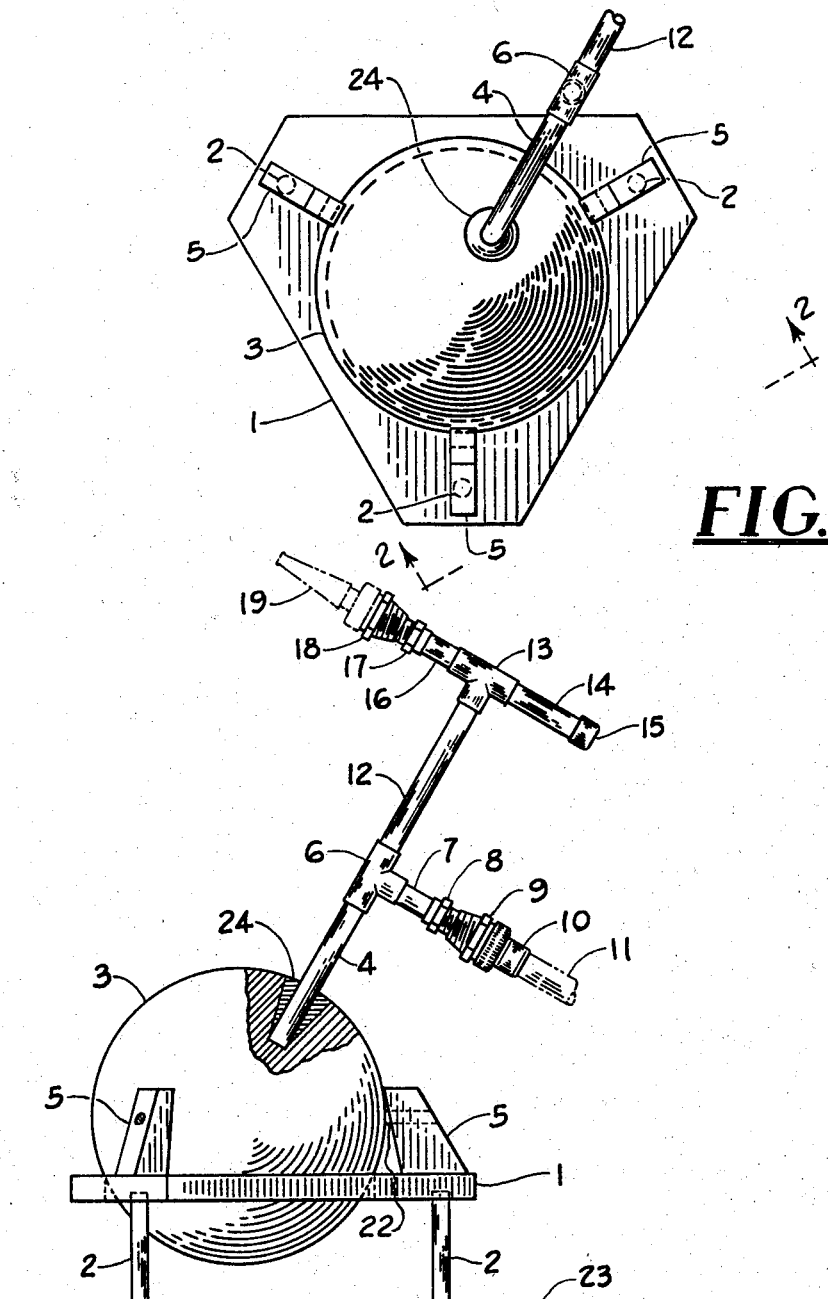
FIGURE 2 is a side elevation view of the complete device as seen along the line 2—2 of FIGURE 1.
Figure 3:
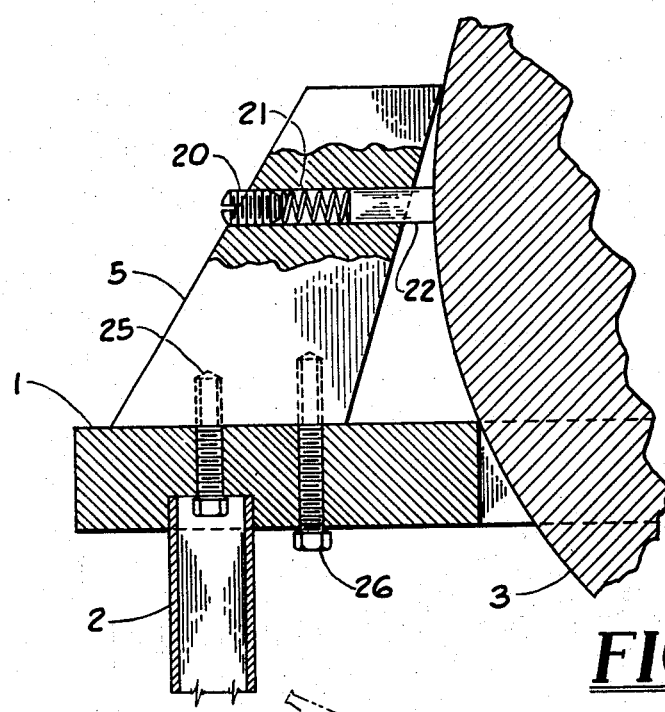
FIGURE 3 is a detailed partial cross-sectional view of 5 and its relation to the sphere 3 and base 1.
Figure 4:
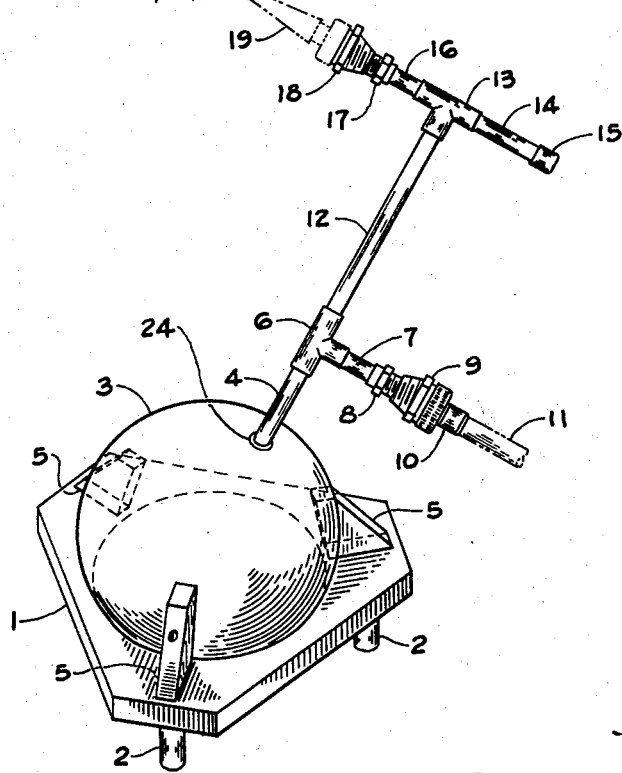
FIGURE 4 is a perspective view.

Detailed description of the construction and operation of the invention

In the embodiment of the invention shown in the accompanying drawing, 1 indicates the base of the nozzle positioner held off the ground 23 by three legs 2.

The sphere 3, made of dense material to provide a low center of gravity of the movable mass, "rides" on the edge of the hole cut in the base 1. Three upright arms 5 attached to the base 1 by means of bolts 25 and 26 serve to keep the sphere 3 and the base 1 from separating while the invention is being carried off the ground 23. Adjustable screws 20 compress springs 21, drive wedges 22 against the surface of the sphere for the necessary fraction to overcome the reactive force caused by water emitting from nozzle 19.

Water enters from the garden hose 11 equipped with female couplings 10 at each end, flows through the piping system consisting of hose connector 9, adaptor 8, metallic tubing 7, T 6, metallic tubing 12, T 13, metallic tubing 16, adaptor 17, nozzle connector 18, and leaves the nozzle 19. Metallic tubing 4 extending from T 6 is anchored to sphere by cement 24.

Metallic tubing 14, one end joined to T 13 and the other end closed by cap 15, forms the handle for carrying and adjusting the nozzle positioner.

The direction of flow of water from the nozzle 19 is controlled by tilting the handle 14 to the desired position.

Having thus described the invention, what is claimed and desired to be secured by Letters Patent is:

1. A portable manually operated garden hose nozzle positioning device comprising a three legged support adapted to rest on either steep or level terrain and to frictionally resist translation from a location once established for said device, a spherical body universally movable about the center of a circular opening onto which said body nestles in said support to furnish stability against rearward thrust of water flowing from said device, a set of keepers geometrically located on said support to confine said body to said support, a tubular stem radiating upward from said body and anchored to said body to form a piping system with means for connecting a garden hose to lower end of said stem adjacent to said body, the upper end of said stem terminating in a juncture with a second tubular stem to form a T-connection, one end of second said stem provides a handle for adjusting and transporting said device, the other end of second said stem contains means for nozzle connection.

2. A garden hose nozzle positioning device according to claim 1 in which spring loaded and adjustable wedges are provided to exert by the keepers against the spherical body to resist the reaction caused by water flowing from said nozzle, thereby permitting said nozzle to be situated high above ground for water to attain greater range and ground coverage.

References Cited

UNITED STATES PATENTS

| | | | |
|---|---|---|---|
| 979,382 | 12/1910 | Coonradt | 239—587 X |
| 3,012,731 | 12/1961 | Williams | 239—280.5 |

ALLEN N. KNOWLES, *Primary Examiner.*

M. Y. MAR, *Assistant Examiner.*

U.S. Cl. X.R.

239—587; 248—83, 181; 108—27